S. F. ORR.
POWER TRANSMITTING APPARATUS.
APPLICATION FILED DEC. 18, 1907.

902,677.

Patented Nov. 3, 1908.

WITNESSES:

INVENTOR
Scott F. Orr.
BY
Geo. H. Strong
ATTORNEY

UNITED STATES PATENT OFFICE.

SCOTT F. ORR, OF OAKLAND, CALIFORNIA.

POWER-TRANSMITTING APPARATUS.

No. 902,677.　　　Specification of Letters Patent.　　　Patented Nov. 3, 1908.

Application filed December 18, 1907. Serial No. 407,046.

*To all whom it may concern:*

Be it known that I, SCOTT F. ORR, citizen of the United States, residing at Oakland, in the county of Alameda and State of California, have invented new and useful Improvements in Power-Transmitting Apparatus, of which the following is a specification.

My invention relates to a mechanism for the transmission of power, the variation of speed transmitted from approximately constant power, and means for reversing the direction of motion of the driven parts.

It consists in a combination of mechanism, and in details of construction, which will be more fully explained by reference to the accompanying drawings, in which—

Figure 1:
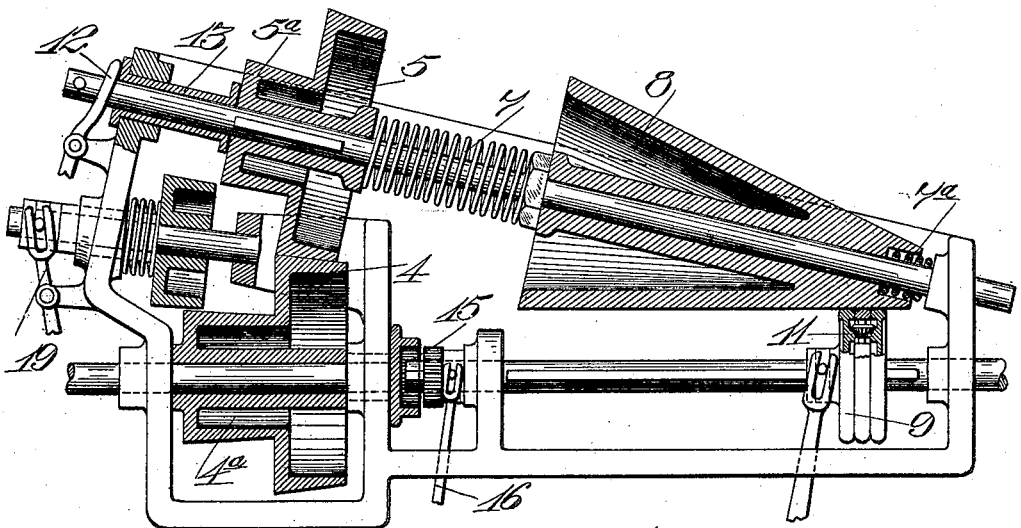
Figure 2:
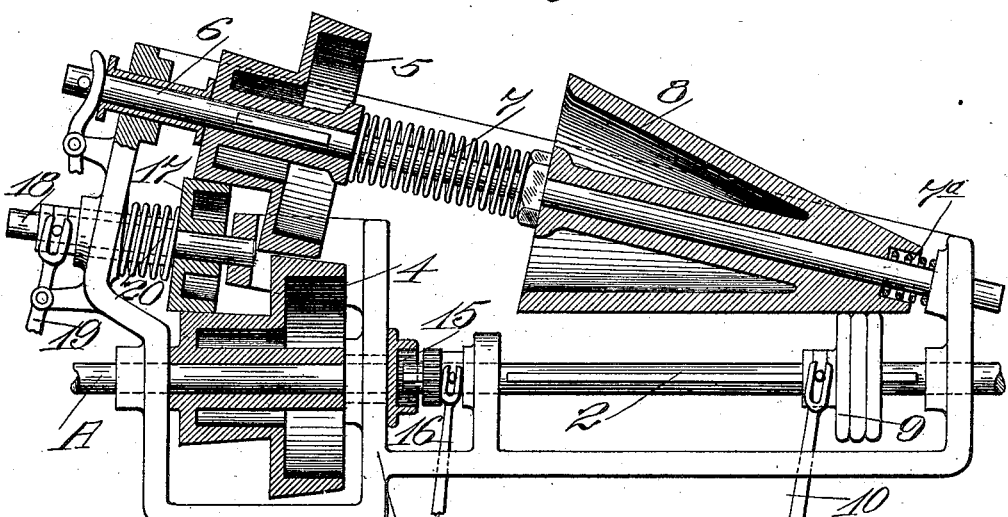

Figure 1 is a side elevation illustrating my apparatus, with the forward driving parts in mesh, and the reverse parts disengaged. Fig. 2 is a similar view, with the forward driver disengaged, and the reverse in engagement.

It is the object of my invention to transmit power and vary the speed of a driven shaft by means of frictional contacting drums in the place of gears, and in means for shifting parts of the apparatus to vary or reverse the speed. It also includes a means by which the frictional surface of the contacting parts may be varied, without being open to the objection of different rates of motion of one of the contacting parts, by reason of the varying diameter of the contact surface of the other part.

I have here shown my invention in diagrammatic views illustrating one means of carrying it out; but it will be understood that various modifications of the device, and changes of position may be made without departing from the spirit of my invention.

A is the engine or motor-shaft, and 2 is a shaft independent of and in line therewith; these shafts being suitably journaled and supported in any desirable frame, as at 3. The ends of the shafts A and 2 are properly journaled or supported in line with each other, as shown, and the shaft A carries upon it a driving-wheel or pulley 4.

Power is transmitted from the drum or pulley 4 to drive a drum or pulley 5 which is mounted upon a shaft 6. The shaft 6 is journaled at an incline with the shaft 2, and carries upon it a cone-shaped pulley 8. The angle of the shaft and the divergence of the cone 8 is such that the side of the cone nearest to the shaft 2 is substantially parallel with said shaft, so that a drum or pulley having the proper contact face and carried upon a feather on the shaft 2, with its face in contact with the contiguous side of the cone 8, will be driven by said cone; and motion transmitted from the cone through this drum or pulley 9 will be transmitted to the shaft 2, and thence to the part to be driven, and the speed varied by the position of drum 9 when in contact with the cone 8.

By means of a lever or suitable shifting mechanism, which is illustrated at 10, the drum or pulley 9 may be shifted from the smaller end where the least speed will be transmitted to it, to the larger end of 8 where the greatest speed may be transmitted; and any intermediate speeds may be obtained by leaving the drum 9 at such intermediate points as will accomplish the desired speed. It will be understood that the lever 10, which represents the shifting mechanism, may be of any suitable or well known description, and that it may be held at any point of adjustment by segmental or other fixed racks, and a latch carried upon the lever. This mechanism not being part of my invention, is not here shown.

A difficulty in transmitting power to or from a conical surface arises from the fact that the different diameters of the cone produce different rates of revolution; and if the drum or pulley 9 is made of sufficient width to provide the necessary frictional surface, that part of the cone nearest to the smaller end will travel at a less speed than the portion toward the larger end. Thus there is a continual torsional or grinding movement between the two surfaces, which soon wears one or the other and reduces their efficiency. I overcome this difficulty, and at the same time provide a sufficient frictional and traction surface, by making the drum or pulley 9 in a plurality of independent sections, so mounted upon the internal hub which slides upon the shaft 2, that these sections are capable of independent rotation. In order to transmit power to or from this drum, I have shown a differential mechanism of any suitable or well known character, whereby the different parts of the drum may be moved at a slightly different rate of speed, depending upon their relative position to the cone through which power is transmitted. Such a differential gearing is herein shown as comprising spaced internally toothed gears and an intermediate pinion, said gears being shiftably mounted on the shaft 2; and by means of the yielding connection of the differential gearing it will be manifest that while power is transmitted through all the sections of the surface, the outer ones may travel at different rates of speed, while at the same time receiving or transmitting power without any slipping friction caused by their separation on the line of the cone. It will thus be seen that the full frictional and traction effect may be transmitted from the cone to drums or pulleys having a sufficient surface of contact to insure the transmission of the full power of the motor.

In order to transmit motion from the drum or pulley 4 to 5, it will be necessary that the drum 5 be held in sufficient frictional contact with the drum 4; and in order to do this, the drum 5 may be acted upon by a lever 12 through any suitable loose connection, as at 13, and the pressure thus applied will force the drum 5 along the inclined shaft 6, so that the two surfaces of 4 and 5 are brought into sufficient frictional contact. When the pressure of the lever is withdrawn, the drum 5 will be retracted along the shaft 6, by the pressure of a spring 7 which is located on the shaft 6 between the drums 5 and 8. This retraction of the drum 5 also removes its face from contact with the face of the drum 4, by reason of the angular divergence of the shafts A and 6, and no motion will then be transmitted from the shaft A to the conical drum 8.

Between the smaller end of the cone 8 and the journal, or a stationary contact at that end, is a spring 7ª of less stiffness than that of the spring 7. Both these springs are compressed when the drum 5 is forced into operative contact with drum 4, and when relieved of pressure both drums will be forced backwardly along the shaft, the drum 5 out of contact with the drum 4, and the cone drum 8 out of contact with the drum 9. When this has been done, the drum 9 may be shifted to any point along the cone 8 to change speed, and the driving drums reengaged. While these driving drums and the cone 8 are out of engagement, connection may be made between the shaft A and the shaft 2 by means of any suitable or well known clutch, as indicated at 15, said clutch being actuated by a lever 16. Under this condition it will be seen that no driving takes place through the cone 8, but a direct connection is made from the motor-shaft A to the part to be driven. The motion may be reversed, as follows: The clutch 15 being out of engagement, and the drum 5 also out of engagement with the drum 4, an idler drum 17 which is mounted upon a shaft 18 located between the shafts A and 6, is moved so that its periphery engages both of the hubs or smaller drums 4ª and 5ª, which form extensions respectively of the drums 4 and 5. This idler 17 may be normally retracted by a lever 19, and forced into engagement by a spring 20; but it will be understood that in all constructions of this sort, either a lever or a spring may advance the drum in either direction. The peripheries of the drums 4ª, 5ª and 17 are so formed as to provide a frictional contact sufficient to transmit motion and power, when engaged.

In order to avoid or reduce the objection previously stated, to the contacting conical surfaces, I divide the inclination of the shafts A, 6 and 18, so that the bevel or taper of the drums 4 and 5, and 4ª and 5ª, is correspondingly divided; and if the drums are not too broad, the differences in diameter of their ends may be in a measure disregarded. If, however, it is found desirable, it will be understood that a differential device, similar to that previously described, may be applied to one or the other of said drums.

The structure herein shown is to a considerable extent diagrammatic, especially in the arrangement of the various levers, and no attempt has been made to show the handles by which they are actuated, in suitable operative relation, this being largely dependent upon the use to which the device is to be put.

Having thus described my invention, what I claim and desire to secure by Letters Patent is—

1. In an apparatus of the character described, a motor-shaft, an independent transmitting shaft journaled in line therewith, a drum composed of a plurality of parts having its hub slidably mounted upon a feather on the transmitting shaft, and a differential gear connection between the drum sections, a cone, and shaft for the cone journaled at an angle with the transmitting shaft such that the contiguous face of the cone is parallel with said shaft, so that the drum faces contact therewith, a drum mounted upon the motor-shaft, a second drum mounted upon a sleeve on the inclined shaft, pressure means by which said drum may be forced into contact with the motor drum, and means whereby said drum may be retracted relative to the pressure and out of contact with the motor drum.

2. In an apparatus of the character described, a power transmitting shaft, a drum thereon composed of a plurality of segments, a differential gear whereby said segments are independently movable, a hub for said drum, means whereby it may be moved upon a feather upon its shaft, a cone, a shaft therefor journaled diagonally to the drum-carrying shaft, said cone having its contiguous face parallel with the drum shaft and capable of contact with the drum faces, a motor-shaft in line with the power shaft, a driving drum carried thereon, a drum slidably mounted upon a feather on the inclined cone shaft, a spring by which said drum is normally held out of engagement with the motor drum, means coacting with said spring whereby said drum may be reciprocated in line with the inclined shaft and into or out of frictional contact with the motor drum, and an idler, and means whereby it may be thrown into contact with both the drums to produce a reverse motion of the apparatus and the power shaft.

3. In an apparatus of the character described, a motor shaft, a shaft inclined relative thereto, a cone on the inclined shaft, drums mounted upon said shafts, mechanism by which one of said drums may be slidably moved into or out of contact with the other, a transmission shaft in line with the motor shaft and parallel with the contiguous face of the cone, a drum slidable on a feather on the transmission shaft, and a clutch to engage or disengage the motor and transmission shafts.

4. In an apparatus of the character described, a motor shaft, a shaft inclined relative thereto, a cone on the inclined shaft, cone drums each having cone-shaped hubs, means for moving the cone-drum longitudinally upon the inclined shaft to engage or disengage the drums and simultaneously move the cone along its shaft, a transmission shaft in line with the motor shaft, a drum slidable on a feather on said shaft so as to contact with different diameters of the cone face, for forward driving, a shaft intermediate the motor and cone shafts, an idler slidable on said intermediate shaft, cone drums in line with the forward drive cone drums, and means to engage said idler therewith to reverse the motion of the cone shaft when the forward drive cones are disengaged.

In testimony whereof I have hereunto set my hand in presence of two subscribing witnesses.

SCOTT F. ORR.

Witnesses:
C. C. BORTON,
A. E. WILLIAMS.